G. A. Stone,
Journal Bearing.
N° 25,921.
Patented Oct. 25, 1859.
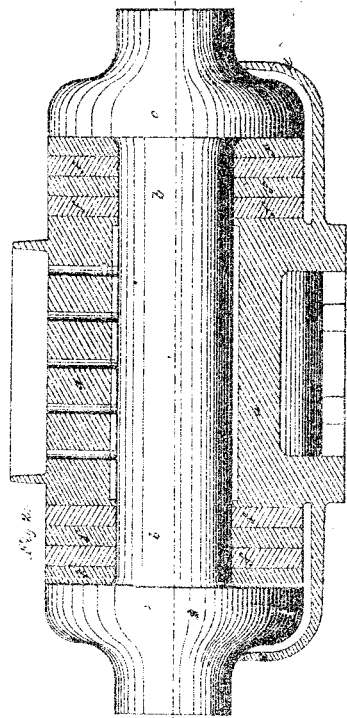
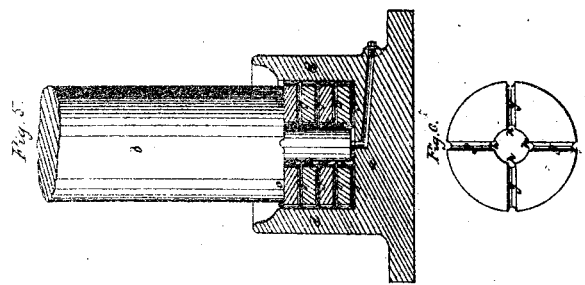
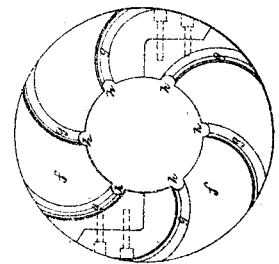
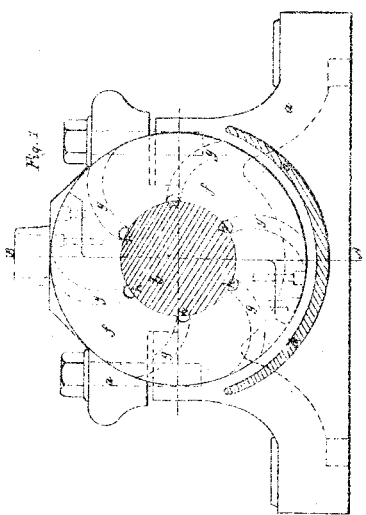
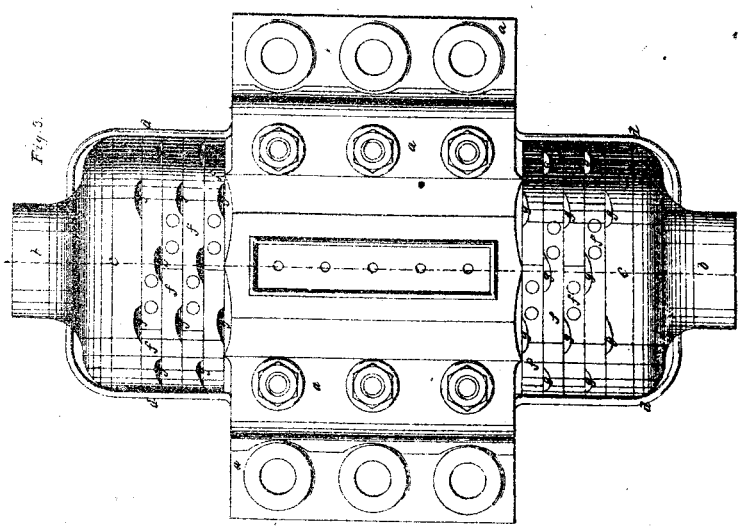
Witnesses:
Inventor
George A. Stone

UNITED STATES PATENT OFFICE.

GEORGE A. STONE, OF ROXBURY, MASSACHUSETTS.

THRUST-BEARING FOR ROTATING SHAFTS.

Specification of Letters Patent No. 25,921, dated October 25, 1859.

*To all whom it may concern:*

Be it known that I, GEORGE A. STONE, of the city of Roxbury, in the county of Norfolk and State of Massachusetts, have invented certain new and useful Improvements in Thrust Bearings or Bearings to Prevent the Endwise Motion of Shafts, and that the following specification, taken in connection with the drawings, is a full, clear, and exact description thereof.

In the drawings, Figure 1 is a vertical section through a shaft in the meeting plane of two washers showing a ring or washer and pillow block, in elevation and an oil reservoir in section. Fig. 2 is also a vertical section through the center of a shaft pillow block washers &c. the washers being drawn all in the same angular position and in such a position as not to show the grooves for lubrication. Fig. 3 is a plan or top view of the same. Fig. 4 is an elevation of one of the rings or washers, the plan represented in all these figures being specially applicable to horizontal or nearly horizontal shafts. Fig. 5 is an elevation of a vertical shaft with the washers and step and oil reservoir in section and Fig. 6 is a plan of one of the washers.

My improvements are applicable to shafts placed at any angle with the horizon or those that are horizontal but were devised with more especial reference to propeller shafts which are horizontal or nearly so — and the object of my invention is to prevent the end play of shafts, or their motion in the direction of their length, when any force tends to move them in such a direction, and at the same time to provide for the thorough lubrication of all the moving parts so that there may be as little friction as possible.

Shafts of propeller steamers which give motion to the propeller and on which the propellers are mounted have a strong tendency to thrust forward while the ship is going ahead and backward when the engines are reversed and the vessel is going stern first. A great variety of contrivances have been devised for holding such shafts in place, some better some worse, and among others a series of loose rings or washers have been fitted between a collar on the shaft and a pillow block or some stationary piece fast to the vessel. These washers revolve by friction at speeds less than that of the shaft and would be unobjectionable were it not for the difficulty of lubricating the rubbing surfaces. This want of lubrication increases the friction and the washers under the enormous pressure sometimes heat and stick fast. Now my invention consists in providing such rings or washers with a series of grooves leading from their inner to their outer edges, and cut in their faces when such washers thus grooved are combined with a collar or collars or their equivalents on the shafts and with a stationary piece to bear against and a reservoir or its equivalents for holding lubricating material. And the nature of the second part of my invention consists in loose washers or rings surrounding a shaft, provided with grooves on their faces leading from their inner to their outer edges and also with grooves along their inner edges in combination with a collar or collars on a shaft; with a fast bearing to resist the strain and with some reservoir or its equivalent to contain lubricating material.

In the drawings a pillow block and binder with proper brasses or their equivalents and supposed to be fastened permanently to the hull of a ship or to a foundation is shown at *a, a, a*. The shaft whose endwise motion or thrust is to be counteracted is represented at *b, b*, and on this shaft are formed or firmly fastened two collars *c, c*. The arrangement here shown being designed to prevent motion in both directions. A reservoir for oil or other lubricating material is shown at *d, d* and between the collars and the pillow block filling up the space between them or nearly so is a series of loose washers or rings *f, f*. Each of these washers has on one face thereof grooves such as *g, g*, extending from the inner to the outer edge and shown in the drawings as extending in a spiral or scroll from the inner to the outer part of the washer. I term the short cylinders of the washer on the inner and outer surfaces thereof edges as a convenient word but they are not properly edges as the washers have some thickness. There are also shown in each washer other grooves *h h* extending along the inner edge of each washer from one face thereof to the other. I prefer to construct these washers in two pieces fastened each to the other by bolts as plainly shown in Fig. 4 as by such construction any washer can be removed and another replaced without disturbing the shaft, but the rings may be made in one piece and slipped on to the shaft before the collars are secured in place; the collars being in such a case not made in one piece with the shaft, but secured thereto by shrinking on or in any other proper way.

When the shaft is revolved the collars or some of them will commence to revolve with it and as they revolve the grooves will lift oil or other lubricating material from the reservoir, and the oil thus lifted will run down the grooves and its passage lubricate the adjacent faces of the washers and when the oil arrives at the shaft it will fill the inner grooves $h$, $h$, which extend along the inner edges of the washers from one face thereof to the other thus lubricating the shaft itself and permitting the washers to revolve freely thereon or more properly speaking permitting the shaft to revolve at greater speed than the collars without any tendency of heating up. As the grooves $g$ $g$ descend on the other side of the shaft all oil not needed will drop out into the reservoir and each groove will take a fresh charge of oil as it rises again on the opposite side of the shaft. The end play of the shaft will be counteracted by the collar bearing against the next adjacent washer which will bear against its neighbor and so on in succession until the strain is transferred to the pillow block.

The scroll form for the grooves is the best as it admits of the use of a shallow reservoir but the groove may be cut in the lines of radii or of any form that fancy may prefer so long as they are combined with a reservoir of such capacity that the faces of the collars will be thoroughly lubricated by means of oil taken from the reservoir. In order to lubricate between the collars and the next adjacent washer I have cut grooves in the faces of the collars themselves similar in all respects to the grooves in the washers or rings such grooves being shown plainly in Fig. 3.

The grooves from the outer edge to the inner edge of the washers, will serve a good purpose when grooves such as $h$ $h$ are not used, but the best result will be obtained when they are employed in combination with grooves such as $g$ $g$. When the shaft revolves in water and the collars pillow block and washers are immersed wholly or partially in water, a special reservoir may be dispensed with, as whatever contains the water be it an artificial construction or a natural basin such as the channel of a river or the bed of the ocean will then become the reservoir for holding the lubricator which in such cases will be water, and experience has proved that that fluid acts well as a lubricator. This remark as to a reservoir applies also to the arrangement for vertical shafts now to be described.

In Figs. 5 and 6 the same letters refer to the same parts that they do in the other figures. The step of the shaft here takes the place of the pillow block and being prolonged forms the reservoir; the collar does not project from the shaft, but the shaft is turned off or made smaller where it enters the washers and the washers are made to fit closely to the inside of the step. They need not necessarily do so, but when they are so made they prevent the shaft from moving out of line and thus obviate the necessity of making some special provision for that purpose. When the collars fill up the step they should be provided with additional grooves along their outer edges, which will serve to conduct oil to lubricate between the collars and the inside of the step. These collars will transfer the strain to the bottom of the step as those shown in the other figures transfer it to the pillow blocks and the grooves perform the same duty of lubricating between the faces of the collars and between the inner edges of the collars and the shaft.

Having thus described my improvement I claim as of my own invention.

1. The combination of these four things namely a collar or collars on the shaft; washers provided with grooves on their faces extending from their outer to their inner edges made substantially as described; a reservoir of oil or other lubricating material, and a pillow block or stationary resistance, all being and acting in combination substantially as hereinbefore described for the purposes set forth, and—

2. In combination with washers provided with grooves on their faces, a reservoir of lubricating material a pillow block or its equivalent, and a collar on a shaft all as specified in my first claim, I claim grooves extending from face to face of the washers made substantially in the manner and serving the purposes described.

In testimony whereof I have hereunto subscribed my name in the city of Boston on this 19th day of September, A. D. 1859.

GEORGE A. STONE.

In presence of—
BENJ. F. COOKE,
JNO. L. HUNTER.